United States Patent [19]

Asawa et al.

[11] Patent Number: 4,942,623
[45] Date of Patent: Jul. 17, 1990

[54] DEVICE AND METHOD FOR MODAL SEPARATION AND COMBINATION IN AN OPTICAL FIBER INTRUSION DETECTION SYSTEM

[75] Inventors: Charles K. Asawa, Pacific Palisades; Shi-Kay Yao, Anaheim; John D. Anderson, Manhattan Beach, all of Calif.

[73] Assignee: TRW Inc., Redondo Beach, Calif.

[21] Appl. No.: 11,400

[22] Filed: Feb. 4, 1987

Related U.S. Application Data

[63] Continuation of Ser. No. 507,422, Jun. 16, 1983, abandoned.

[51] Int. Cl.[5] .......................... G03B 5/14; H04B 9/00
[52] U.S. Cl. ................................ 455/612; 455/610; 350/96.15; 350/96.18
[58] Field of Search ............... 350/96.18, 96.31, 96.15, 350/96.23; 455/602, 606, 610, 612; 250/227, 231; 340/555

[56] References Cited

U.S. PATENT DOCUMENTS

| | | | |
|---|---|---|---|
| 4,070,091 | 1/1978 | Taylor et al. | 350/96.33 |
| 4,217,488 | 8/1980 | Hubbard | 350/96.33 |
| 4,237,550 | 12/1980 | Steensma | 455/606 |
| 4,381,137 | 4/1983 | Berg et al. | 350/96.15 |
| 4,436,368 | 3/1984 | Kech | 340/555 |

*Primary Examiner*—Nelson Moskowitz
*Attorney, Agent, or Firm*—Noel F. Heal; Sol L. Goldstein

[57] ABSTRACT

Apparatus and a corresponding method for launching two light beams into an optical fiber as two separate modal groups, and for separating light emanating from a fiber into two modal groups. The apparatus includes first and second lenses and a spatial modal filter in the form of a reflective disc disposed coaxially between the two lenses. When the apparatus is used as a launching device, the first lens operates to collimate light from a source of light modulated by a data signal and intended for launching as lower-order modes. The lower-order-mode light is reflected from the filter and focused by the first lens into an output fiber. The second lens collimates light from a source of light indicative of a monitor signal to be transmitted in the form of higher-order modes. This light is partially blocked by the spatial modal filter, then focused into the output fiber by the first lens. The fiber constrains this light to enter the output fiber at angles of incidence greater than some predetermined threshold angle. When the apparatus is used as a modal separator, the first lens collimates light from an input fiber, and the modal filter reflects only the light corresponding to the lower-order modes, allowing the higher-order modes to pass into the second lens and be focused into an output fiber. The reflected lower-order modes are focused by the first lens into another output fiber.

25 Claims, 1 Drawing Sheet

DEVICE AND METHOD FOR MODAL SEPARATION AND COMBINATION IN AN OPTICAL FIBER INTRUSION DETECTION SYSTEM

This application is a continuation of application Ser. No. 507,422, filed 06/16/83, now abandoned.

BACKGROUND OF THE INVENTION

This invention relates generally to fiber optical communication systems, and, more particularly, to techniques for coupling light of different modes or modal groups into or out of a multimode optical fiber. An optical fiber is basically a cylinder made of transparent dielectric materials. A central region, referred to as the core, is surrounded by one or more annular cladding regions, which are usually surrounded by a protective jacket. In step-index fibers, the core has a fixed refractive index and the cladding has a fixed refractive index lower than that of the core. In simple terms, light rays launched into the fiber tend to be guided along it because of repeated total internal reflections at the cylindrical boundary between the core and cladding materials.

Electromagnetic light fields traveling in the fiber or being scattered by the fiber can be considered as superpositions of simpler field configurations, referred to as the modes of the fiber. The mode concept can be expressed in mathematical terms, but for purposes of explanation of the invention, a discussion in terms of geometric optics is more appropriate. Light rays entering a fiber at relatively low angles of incidence with respect to the longitudinal axis of the fiber are referred to as the lower-order modes of the fiber. Rays entering at higher angles of incidence are referred to as the higher-order modes.

Some rays entering the fiber at very high angles of incidence can be characterized as "leaky," meaning that there will not be total internal reflection of the rays within the fiber, and still others may be characterized as "unguided," meaning hat most of their energy will pass into the cladding and either be absorbed there or be radiated out from the fiber. The invention is concerned with guided lower-order modes and with guided higher-order modes. In communication systems, the different modal groups may be used as different information channels. This is a form of multiplexing, in which a group of lower-order modes is used to carry one information signal and a group of higher-order modes is used to carry another information signal.

In one type of bimodal communication system, the higher-order modes are used not to carry useful information, but rather as an intrusion detection device. When a bend of small radius is applied to an optical fiber, some of the light radiates from the core and may be used to decode the information signal being carried by the fiber. One technique for detecting such intrusion is to use the higher-order modes to carry a signal referred to as a masking signal or a monitor signal. If a fiber is bent to cause radiation of the transmitted light, the higher-order modes will radiate from the fiber core to a much greater degree than the lower-order modes. Monitoring the power ratio at the receiving end of the fiber allows the detection of intrusion of this type.

It essential in such a multiplexing arrangement that separate light signals be launched as lower-order and higher-order modal groups. Any cross-talk between the two modal groups will render them ineffective for multiplexing purposes. In the past, the only technique for launching bimodal signals into a single fiber was to launch a lower-order-mode signal from a light source disposed on the central axis of the fiber, and to launch a higher-order-mode signal from a light source displaced from the axis, to provide higher angles of incidence. Unfortunately, in such an arrangement it is difficult to control with any precision the amounts of light that are launched at various angles into the fiber. For example, some of the light from the centrally located source will be launched as higher-order modes in the fiber if the core-cladding interface of the fiber is not a perfect step index.

It will be appreciated from the foregoing that there is a significant need in fiber-optic communication systems for a technique that will reliably launch two separate light signals into a fiber as two different modal groups. The present invention fulfills this need.

SUMMARY OF THE INVENTION

The present invention resides in apparatus, and a corresponding method, for use in a bimodal intrusion detection system, in which data and monitor signals are launched into a fiber as different modal groups. The invention also provides a related technique for detecting and separating the data and monitor signals emerging from a fiber in which they were carried as two different modal groups. Briefly, and in general terms, the apparatus of the invention as used to launch two signals in this manner includes first and second sources of light for launching into an output fiber data and monitor signals as higher-order modes and lower-order modes, respectively, lens means for focusing light from the first and second sources of light onto an end of the output fiber, and spatial filter means disposed coaxially with the lens means, for constraining light from the first source of light to impinge on the output fiber at angles of incidence exceeding a predetermined threshold angle.

More specifically, the lens means includes a first lens positioned to collimate light emanating from the first light source, and a second lens disposed coaxially with the first lens and functioning to focus light reaching it from the first lens onto an end of the output fiber. Light rays reaching the output fiber from the first source of light are constrained by the spatial modal filter means to impinge on the fiber only at relatively high angles of incidence. In the preferred embodiment of the invention, the spatial modal filter means has a plane reflective surface, and light from the second source of light is focused onto the output fiber through the second lens means. The second source of light is positioned adjacent to the output fiber, and light from the second source is collimated by the second lens, reflected from the spatial modal filter means, and then focused on the output fiber by the second lens.

In one embodiment of the invention, the output or transmission fiber is a graded index fiber, in which the refractive index changes continuously from the axis of the fiber to its outer extremity. In such fibers, the mode of excitation depends not only on the angle of incidence of light, but also on the radial location of the point of excitation. Although launching difficulties have in the past deterred designers of bimodal systems from using graded index transmission fibers, two separate modal groups can be successfully launched into a graded index fiber if the spatial modal filter and lens arrangement of the present invention are also employed.

The apparatus of the invention as used for detection and separation of light from a bimodal communication optical fiber, includes first and second output fibers for receiving light in a higher-order modal group and a lower-order modal group, respectively, and spatial modal filter means having a reflective surface to reflect light emerging from an input optical fiber at angles within a predetermined range of angles with respect to the axis of the fiber, and to pass light not falling within the predetermined range of angles. The apparatus also includes lens means for collimating light emerging from the input optical fiber and for focusing light passed by and reflected from the spatial modal filter means onto the first and second output fibers, respectively.

More specifically, separation of the modal groups is effected by the use of a spatial modal filter in the form of a reflective disc disposed between two lenses. Light from the input fiber is collimated by a first of the lenses and then encounters the reflective disc. Light reflected from the disc corresponds to the lower-order modes and is reflected back through the first lens and into the second output fiber. Light passing around the periphery of the disc corresponds to higher-order modes of the input fiber, and is focused by a second lens onto the first output fiber.

In terms of a method for launching two separate information-carrying light beams into an optical fiber, the invention includes the steps of collimating light from a first source, intended to be launched as lower-order modes, reflecting the collimated light with a spatial filter having a reflective surface, and focusing the reflected light into an output fiber. The method further includes the steps of collimating light from a second source, intended to be launched as higher-order modes, blocking selected portions of the collimated light from the second source, using the same spatial filter, and focusing remaining portions of the collimated light from the second source onto the output fiber. The spatial filter functions to constrain the light rays from the second source to impinge on the output fiber within a predetermined range of angles.

It will be apparent from the foregoing that the present invention represents a significant advance in the field of optical fiber communication systems. In particular, the invention provides a reliable technique for combining data and monitor signals on a single fiber in the form of separate modal groups, and for separating data and monitor signals emerging from a fiber into two modal groups. Other aspects and advantages of the invention will become apparent from the following more detailed description, taken in conjunction with the accompanying drawings.

DESCRIPTION OF THE PREFERRED EMBODIMENTS

Figure 1:
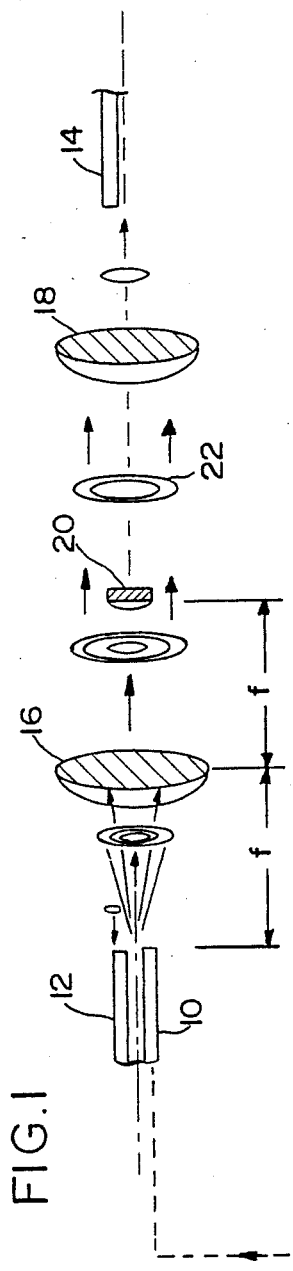
FIG. 1 is a diagrammatic view of apparatus in accordance with the invention, for separating light emerging from a fiber into two modal groups.

As shown in the drawings for purposes of illustration, the present invention is concerned with optical fiber communication systems, and specifically with systems in which two or more modal groups are employed to a data signal and a monitor signal in a single fiber, the monitor signal being employed to detect any attempt to intrude upon the privacy of the data communication by diverting some portion of the data signal. The principal difficulty in such systems is to provide a technique for reliably launching separate light beams in separate modal groups, and for separating the modal groups at the receiving end of the fiber.

In accordance with the present invention, a spatial modal filter is employed for both these purposes. For launching the separate beams, the filter, which has a reflective surface, effectively combines the beams by reflecting a lower-order-mode beam and partially blocking a higher-order-mode beam. When focused onto an output fiber, the filtered higher-order-mode beam is limited to impinge on the fiber at a selected range of angles of incidence. When used to separate modal groups, the spatial filter reflects the lower-order modes and permits only the higher-order modes to pass the filter.

As shown in FIG. 1, light emerging from an input fiber, indicated by reference numeral 10, is to be separated into light of a lower-order modal group and a higher-order modal group, for transmission into output fibers 12 and 14, respectively. The apparatus for performing this separation includes two lenses 16 and 18, shown as bi-convex lenses, and a spatial modal filter 20, the lenses and the filter being on a common longitudinal axis. The input fiber 10 and the output fiber 12 are located adjacent to each other and on opposite sides of the axis of the lenses. The ends of the fibers 10 and 12 are in the first focal plane of the lens 16. Therefore, a cone of light emerging from the input fiber 10 is collimated into a practically parallel beam by the lens 16, the collimated beam converging with the axis of the lenses at the second focal plane of the lens 16.

The spatial modal filter 20 is located in the second focal plane of the lens 16 and presents a reflective surface toward the lens 16. Accordingly, the filter 20 reflects a central portion of the collimated beam from the input fiber 10 back toward the lens 16, but along a path symmetrically opposed to the outgoing path from the lens. The portion of the output beam from the fiber 10 that is reflected from the surface of the filter 20 corresponds to those rays that have small angles with respect to the fiber axis. These represent the lower-order modes of the fiber. The beam reflected from the filter 20 is focused at the first focal plane of the lens 16, and is launched into the lower-order-mode output fiber 12.

Those portions of the collimated beam from the input fiber 10 not reflected by the spatial modal filter 20 take the form of an annular field pattern, as shown at 22. This field pattern, which results from only higher-order modes emerging from the input fiber 10, is focused by the second lens 18 onto the output fiber 14 employed to receive the higher-order-mode output.

Figure 2:
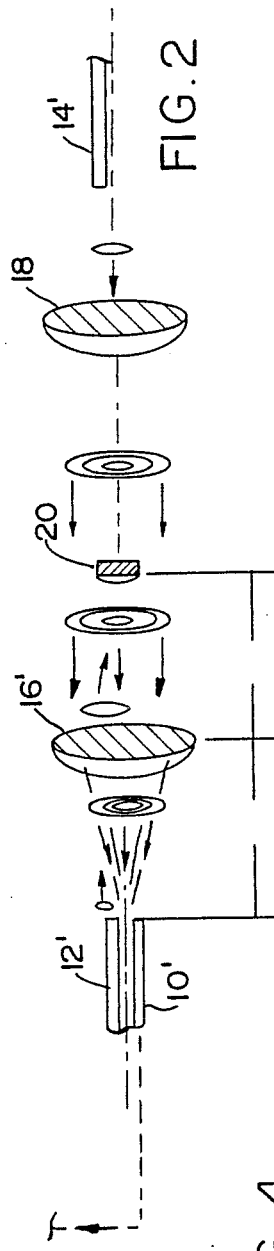
FIG. 2 is a diagrammatic view of apparatus similar to that of FIG. 1, but for launching two light beams into a single fiber as separate modal groups.

The apparatus shown in FIG. 2, for launching two light beams as separate modal groups in a single fiber, is structurally identical to that shown in FIG. 1. The only difference is that the directions of the light paths are reversed. Also the input fiber 10 of FIG. 1 is replaced by an output fiber 10 in FIG. 2, and the two output fibers 12 and 14 are replaced by input fibers 12' and 14'. Lower-order modes are provided by input fiber 12' and are collimated by lens 16 and reflected by the spatial modal filter 20. The reflected rays are then focused by the same lens 16 and thereby launched into the output fiber 10'.

The other input fiber 14' provides the higher-order modes, which are collimated by the second lens 18, and then encounter the filter 20. The filter 20 blocks passage of all but an outer annular ring of the higher-order-mode field pattern. The higher-order modes are focused by the first lens 16 into the output fiber 10'. Although the field pattern of the higher-order-mode light is a solid circle when it reaches the focal plane of the first lens 16, the light rays impinging on the output fiber 10' are constrained by the filter 20 to have an angle of incidence greater than a predetermined threshold. In this manner, the light from input fiber 14' is launched into the output fiber 10' as only higher-order modes.

Although the modal filter 20 is shown in the illustrative embodiment as a disc, it will be understood that other configurations are equally possible. For example, the filter could be annular in shape, with the output fibers 12 and 14 being reversed in position, or the input fibers 12' and 14' being reversed in position.

Figure 4:
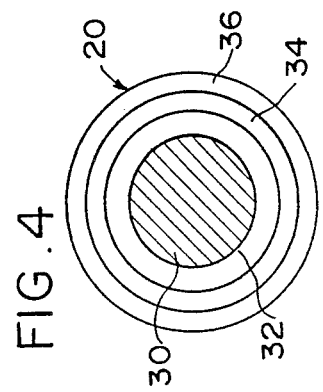
FIG. 4 is a cross-sectional view of a spatial modal filter of the invention, showing an optional guard-ring structure.

The modal filter 20 may also include guard rings, as shown in FIG. 4. The filter in this form includes a reflective disc 30 in the center, an absorptive guard ring 32 surrounding the disc, and a transmission ring 34 surrounding the guard ring. A second guard ring 36 may also be included around the transmission ring 34. The intermediate guard ring 32 serves to establish and maintain better separation between the two modal groups utilized to transmit information along the fiber.

Figure 3:
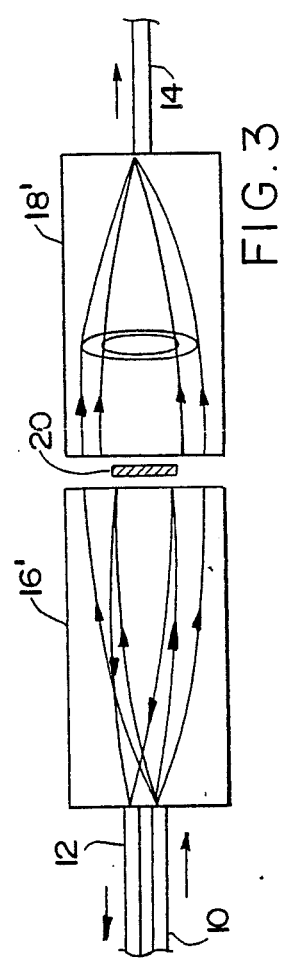
FIG. 3 is a diagrammatic view of apparatus similar to that of FIG. 2, but employing graded-index rod lenses instead of conventional lenses.

A more practical embodiment from a manufacture and assembly standpoint is shown in FIG. 3. Instead of the conventional lenses 16 an 18, graded-index rod lenses 16' and 18' are used in this configuration. The action of the spatial modal filter 20 is identical to that described in relation to FIG. 1. The structure shown in FIG. 4 can also be employed for launching two light beams into a bimodal fiber. Illustration of a bimodal launching arrangement requires only that the directions of the arrows in FIG. 4 be reversed.

In accordance with another important aspect of the invention, the transmission fiber 10 or 10' may be a graded index fiber, i.e., one in which the refractive index varies continuously along a radial line from the axis of the fiber. In fibers of this type, the mode of excitation depends not only on the angle of incidence of light, but also on the radius or distance from the axis of the point of excitation. Light impinging on the fiber at relatively large radial distances from the axis will excite higher-order modes than light impinging near the axis at the same angle of incidence. These relationships are discussed more fully in a related patent application by C. Asawa, entitled "Bimodal Intrusion Detection in an Optical Fiber Communication System Using Graded Index Fiber," filed concurrently with this application. The Asawa application referred to is incorporated by reference into this specification, and a copy is filed as an appendix to this specification, so that it will remain in the patent file and be more readily available to the public.

When a graded index transmission fiber is used, both the angles of incidence and the locations of the points of excitation have to be carefully controlled to achieve launching in the two desired modal groups. The spatial modal filter and lens arrangements described in this specification provide a convenient technique for this purpose.

It will be appreciated from the foregoing that the present invention represents a significant advance in the field of communication systems employing optical fibers. In particular, the invention provides a reliable technique for either launching data and monitor signals into a single fiber in the form of two separate modal groups, or separating light emerging from a fiber into the two modal groups representing the data and monitor signals. It will also be appreciated that, although the illustrative embodiments of the invention have been described in detail, various modifications may be made without departing from the spirit and scope of the invention. Accordingly, the invention is not to be limited except a by the appended claims.

We claim:

1. For use in a bimodal intrusion detection system for optical fiber communications, apparatus for launching two separate information-carrying light beams into an optical output fiber, said apparatus comprising:

first and second sources of light for launching a monitor signal as higher-order modes and a data signal as lower-order modes, respectively, in an output fiber;

lens means for focusing light from said first and second sources of light onto an end of the output fiber; and spatial modal filter means disposed coaxially with said lens means, for constraining light from said first source of light to impinge on the output fiber at angles of incidence exceeding a predetermined threshold angle.

2. Apparatus as set forth in claim 1, wherein:

said lens means includes a first lens positioned to collimate light emanating from said first source of light, and a second lens disposed coaxially with said first lens and functioning to focus light reaching it from said first lens onto an end of the output fiber; and said spatial modal filter means is disposed between said first and second lenses.

3. Apparatus as set forth in claim 2, wherein:

light from said second source of light is focused onto the output fiber through said second lens.

4. Apparatus as set forth in claim 3, wherein:

said spatial modal filter means has a plane mirrored surface;

said second source of light is positioned adjacent to the output fiber;

light from said second source of light is collimated by said second lens, reflected from said spatial modal filter means, and then focused on the output fiber by said second lens.

5. For use in a bimodal intrusion detection system for optical fiber communications, apparatus for separation of light from an input optical fiber into modal groups, said apparatus comprising:

first and second output fibers for receiving a monitor light signal as a higher-order modal group and a data light signal as a lower-order modal group, respectively;

spatial modal filter means having a reflective surface to reflect light emerging from an input optical fiber at angles falling within a predetermined range of angles with respect to the axis of the fiber; and lens means for collimating light emerging from the input optical fiber and for focusing light passed by and reflected from said spatial modal filter means onto said first and second output fibers, respectively.

6. Apparatus as set forth in claim 5, wherein:
said lens means includes a first lens for collimating light from the input fiber and focussing light reflected from said spatial modal filter means onto said second output fiber, and a second lens for focusing light passed by said spatial modal filter means onto said first output fiber; and
said spatial modal filter is a reflective disc disposed between and coaxial with said first and second lenses.

7. Apparatus as set forth in claim 6, wherein:
said spatial modal filter means includes a circular disc presenting a reflective surface toward said second source of light, to reflect collimated light from said second source back through said second lens and into the output fiber.

8. For use in a bimodal intrusion detection system for optical fiber communications, apparatus for launching two separate light beams into an optical fiber as two modal groups, said apparatus comprising:
first lens means, for collimating a first source of light modulated as a data signal to be launched into an output fiber as a lower-order modal group;
a spatial modal filter in the form of a reflective disc, disposed coaxially with respect to said first lens means and in a focal plane of said first lens means, whereby collimated light from the first source of light is reflected back through said first lens means and focused into the output fiber; and
second lens means coaxial with the first and disposed to place said spatial modal filter between said first and second lens means, said second lens means functioning to collimate a second source of light functioning as a monitor signal to be launched into the output fiber as a higher-order modal group, whereby a central region of the collimated light field from the second source is blocked by said spatial modal filter, and the remaining light from the second source is focused into the output fiber through said first lens means, but is constrained by said spatial modal filter to enter the output fiber at relatively large angles of incidence.

9. Apparatus as set forth in claim 8, wherein:
said first and second lens means are graded-index rod lenses.

10. Apparatus as set forth in claim 8, wherein said spatial modal filter includes:
a central circular reflective region; and
a first annular guard ring of light absorbing material, surrounding said circular reflective region, to enhance separation between the two modal groups.

11. Apparatus as set forth in claim 10, wherein said spatial modal filter further includes:
a transparent annular region surrounding said first annular guard ring; and
a second annular guard ring surrounding said transparent region.

12. For use in a bimodal intrusion detection system for optical fiber communications, apparatus for separating light from an input fiber into two modal groups, said apparatus comprising:
first lens means, for collimating light emanating from an input fiber in a multiplicity of modes;
a spatial modal filter in the form of a reflective circular disc disposed coaxially with said first lens means, whereby a data signal in the form of a lower-order modal group of the collimated light from the input fiber is reflected from said disc and focused by said first lens means into a lower-order-mode output fiber, and a monitor signal in the form of a higher-order modal group of the collimated light passes around the periphery of said disc; and
second lens means disposed coaxially in the path of the higher-order-mode light passing said disc, and operative to focus the higher-order-mode light into a higher-order-mode output fiber.

13. Apparatus as set forth in claim 12, wherein:
said first and second lens means are graded-index rod lenses.

14. Apparatus as set forth in claim 12 wherein said spatial modal filter includes:
a central circular reflective region; and
a first annular guard ring of light absorbing material, surrounding said circular reflective region, to enhance separation between the two modal groups.

15. Apparatus as set forth in claim 14, wherein said spatial modal filter further includes:
a transparent annular region surrounding said first annular guard ring; and
a second annular guard ring surrounding said transparent region.

16. For use in a bimodal intrusion detection system for optical fiber communications, apparatus for use in combining or separating data and monitor modal groups for transmission along an optical fiber, said apparatus comprising:
a spatial modal filter in the form of a reflective disc, operative to reflect light impinging on it and to allow light not impinging on it to pass around its periphery;
a first lens coaxial with said spatial modal filter and having a focal point located at the end of a first fiber, for carrying only a monitor signal as higher-order-mode light; and
a second lens coaxial with said first lens and with said spatial modal filter, and positioned with said filter in one focal plane and with second and third fibers in the other focal plane, the second fiber for carrying only a data signal as lower-order-mode light and the third fiber for carrying light in multiple modes;
whereby lower-order-mode light is reflected between the second and third fibers by said spatial modal filter, and higher-order-mode light is transmitted between the first and third fibers, around said spatial modal filter.

17. For use in a bimodal intrusion detection system for optical fiber communications, a method for launching two separate informationcarrying light beams into an optical fiber, said method including the steps of:
collimating light from a data signal source, intended to be launched as lower-order modes;
reflecting the collimated light with a spatial filter having a reflective surface;
focusing the reflected light into an output fiber;
collimating light from a monitor signal source, intended to be launched as higher-order modes;
blocking selected portions of the collimated light from the monitor signal source, using the same spatial filter; and focusing remaining portions of the collimated light from the monitor signal source onto the output fiber, whereby the spatial filter functions to constrain the light rays from the monitor signal source to enter the output fiber within a predetermined range of angles of incidence.

18. A method as set forth in claim 17, wherein:
said reflecting step reflects light in a central region, corresponding to the lower-order modes;
said blocking step blocks all light except an outer annular region, corresponding to the higher-order modes; and
the spatial modal filter is operative to constrain light from the monitor signal source to enter the output fiber at relatively large angles of incidence, corresponding to the higher-order modes.

19. For use in a bimodal intrusion detection system optical fiber communications, a method for separating light emanating from a fiber into data and monitor signals transmitted as two separate modal groups, said method comprising the steps of:
collimating the light from the fiber into a collimated light field;
filtering the collimated light field with a spatial modal filter operative to reflect a selected region of the collimated light field and to allow remaining portions to pass;
focusing the reflected portions of the collimated light field, which include only light of one modal group, into an output fiber; and
focusing the non-reflected portions of the collimated light, which include only another modal group, into a second output fiber.

20. A method as set forth in claim 19, wherein:
said filtering step includes reflecting a central region of the collimated light field, corresponding to the data signal transmitted as lower-order modes, and passing an outer region of the collimated light field, corresponding to the monitor signal transmitted as higher-order modes.

21. For use in a bimodal intrusion detection system for fiber optical communications, apparatus for launching an information-carrying light beam and a monitor signal light beam into a single fiber communication link, said apparatus comprising:
a graded index transmission fiber;
first and second sources of light for launching a monitor signal as higher-order modes and a data signal lower-order modes, respectively, into said transmission fiber;
lens means for focusing light from said first and second sources of light onto an end of said transmission fiber; and
spatial modal filter means disposed coaxially with said lens means, for constraining light from said first source of light to impinge on the output fiber at angles of incidence exceeding a predetermined threshold angle, such that the angles and points of excitation for light from said first source result in the launching of higher-order modes and the angles and points of excitation for light from said second source result in the launching of lower-order modes.

22. Apparatus as set forth in claim 21, wherein:
said lens means includes a first lens positioned to collimate light emanating from said first source of light, and a second lens disposed coaxially with said first lens and functioning to focus light reaching it from said first lens onto an end of said transmission fiber; and
said spatial modal filter means is disposed between said first and second lenses.

23. Apparatus as set forth in claim 22, wherein:
light from said second source of light is focused onto the output fiber through said second lens.

24. Apparatus as set forth in claim 23, wherein:
said spatial modal filter means has a plane mirrored surface;
said second source of light is positioned close to said transmission fiber; and
light from said second source of light is collimated by said second lens, reflected from said spatial modal filter means, and then focused on said transmission fiber by said second lens.

25. A bimodal intrusion detection system for use in optical fiber communications, said system comprising:
an optical transmission fiber;
means for launching data and monitor signals into said transmission fiber, said means for, launching including
first lens means, for collimating a first source of light modulated as a data signal to be launched into said transmission fiber as a lower-order modal group,
a spatial modal filter in the form of a reflective disc, disposed coaxially with respect to said first lens means and in a focal plane of said first lens means, whereby collimated light from the first source of light is reflected back through said first lens means and focused into said transmission fiber, and
second lens means coaxial with the first and disposed to place said spatial modal filter between said first and second lens means, said second lens means functioning to collimate a second source of light functioning as a monitor signal to be launched into said transmission fiber as a higher-order modal group, whereby a central region of the collimated light field from the second source is blocked by said spatial modal filter, and the remaining light from the second source is focused into said transmission fiber through said first lens means, but is constrained by said spatial modal filter to enter said transmission fiber at relatively large angles of incidence; and
means for separating the data and monitor signals at a receiving end of said transmission fiber, said means for separating including
third bus means, for collimating light emanating from said transmission fiber,
a second spatial modal filter in the form of a reflective circular disc disposed coaxially with said third lens means, whereby the data signal is reflected from said disc and focused by said third lens means into a signal output fiber, and the monitor signal passes around the periphery of the disc, and
fourth lens means disposed coaxially in the path of the higher-order mode light of the monitor signal, and operative to focus the higher-order-mode light into a monitor output fiber; and
means for comparing the output data and monitor signals to detect intrusion on said transmission fiber.

* * * * *